(12) United States Patent
Chiang

(10) Patent No.: US 8,038,225 B2
(45) Date of Patent: Oct. 18, 2011

(54) BICYCLE HUB ASSEMBLY

(75) Inventor: Pi-Yun Chiang, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 167 days.

(21) Appl. No.: 12/320,725

(22) Filed: Feb. 3, 2009

(65) Prior Publication Data

US 2010/0194183 A1    Aug. 5, 2010

(51) Int. Cl.
*B60B 27/00* (2006.01)
(52) U.S. Cl. ..................... 301/110.5; 301/59
(58) Field of Classification Search ............. 301/59, 301/74, 80, 110.5
See application file for complete search history.

(56) References Cited

U.S. PATENT DOCUMENTS

| | | | | |
|---|---|---|---|---|
| 612,401 A * | 10/1898 | Collmer | ........................ | 384/545 |
| 1,567,638 A * | 12/1925 | Dean | ........................ | 301/110.5 |
| 3,199,922 A * | 8/1965 | Krenz | ........................ | 301/59 |
| 4,424,981 A * | 1/1984 | Maxwell, III | ........................ | 280/288 |
| 4,966,419 A * | 10/1990 | Cunard | ........................ | 301/2.5 |
| 5,626,401 A * | 5/1997 | Terry et al. | ........................ | 301/59 |
| 6,030,052 A * | 2/2000 | Watarai et al. | ........................ | 301/110.5 |
| 6,296,322 B1 * | 10/2001 | Marzocchi et al. | ........................ | 301/124.2 |
| 6,375,273 B2 * | 4/2002 | Pont | ........................ | 301/59 |
| 7,182,410 B2 * | 2/2007 | Fukui | ........................ | 301/110.5 |
| 7,484,812 B2 * | 2/2009 | Meggiolan | ........................ | 301/110.5 |
| 2002/0008422 A1 * | 1/2002 | Tabe | ........................ | 301/110.5 |

* cited by examiner

*Primary Examiner* — Russell Stormer
(74) *Attorney, Agent, or Firm* — Rosenberg, Klein & Lee

(57) ABSTRACT

A bicycle hub assembly includes two end caps which are two collar-shaped member and an axle is connected between the two end caps. A casing is mounted to two respective outer peripheries of the two end caps and accommodates the axle therein. The two end caps and the casing form a smooth and curved outer shape. Two collars are connected to two distal ends of the two end caps and two ends of the casing. Two positioning bolts extend through the collars and are threadedly connected to the two ends of the axle. Multiple copper heads are connected to the two end caps and protrude outward from the casing at an angle so as to be connected to spokes.

14 Claims, 9 Drawing Sheets

BICYCLE HUB ASSEMBLY

FIELD OF THE INVENTION

The present invention relates to a hub assembly, and more particularly, to a bicycle hub assembly having aerodynamic outer profile to reduce the affect caused by turbulence.

BACKGROUND OF THE INVENTION

A conventional bicycle hub assembly is located at the center of the bicycle wheels and spokes are connected between the hub assembly and the rim of the wheel. For the front wheel hub assembly, the front fork can be connected to the flanges of the front wheel hub assembly. For the rear wheel hub assembly, the sprockets of derailleur system can be connected to the rear wheel hub assembly.

FIG. 10 shows a conventional bicycle hub assembly 80 which includes an axle with two circular flanges 81 on two ends thereof and spokes 82 are connected to the two flanges 81. It is noted that the flanges 81 protrude radially outward from the axle and the protruding flanges 81 do not meet the aerodynamic requirement.

When the wheels rotate, side wind is generated due to the rotation and the flanges 81 cause turbulence which increases resistance and affects the speed of the bicycle. Besides, because the spokes 82 are connected to the flanges and the head for fixing the spokes 82 to the flanges 81 protrude out from outside surface of the flanges 81, the heads make the shape of the flanges 81 to be complicated and cause noise and resistance.

The present invention intends to provide a bicycle hub assembly which includes a smooth and aero-dynamic outer profile to guide wind away from the hub and reduce turbulence.

SUMMARY OF THE INVENTION

The present invention relates to a bicycle hub assembly which comprises a support unit includes two end caps which are two collar-shaped member and an axle unit is connected between the two end caps of the support unit. A casing is mounted to two respective outer peripheries of the two end caps of the support unit and accommodates the axle unit therein. Two collars are connected to two distal ends of the two end caps of the support unit and two ends of the casing.

The primary object of the present invention is to provide a bicycle hub assembly which has a smooth and curved outer shape so as to reduce nose and turbulence.

Another object of the present invention is to provide a bicycle hub assembly which includes a casing to accommodate the axle and the two end caps therein such that dust and rain can be avoided from entering the inside of the hub assembly.

Yet object of the present invention is to provide a bicycle hub assembly which can be made of different materials to meet different customers' demands.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
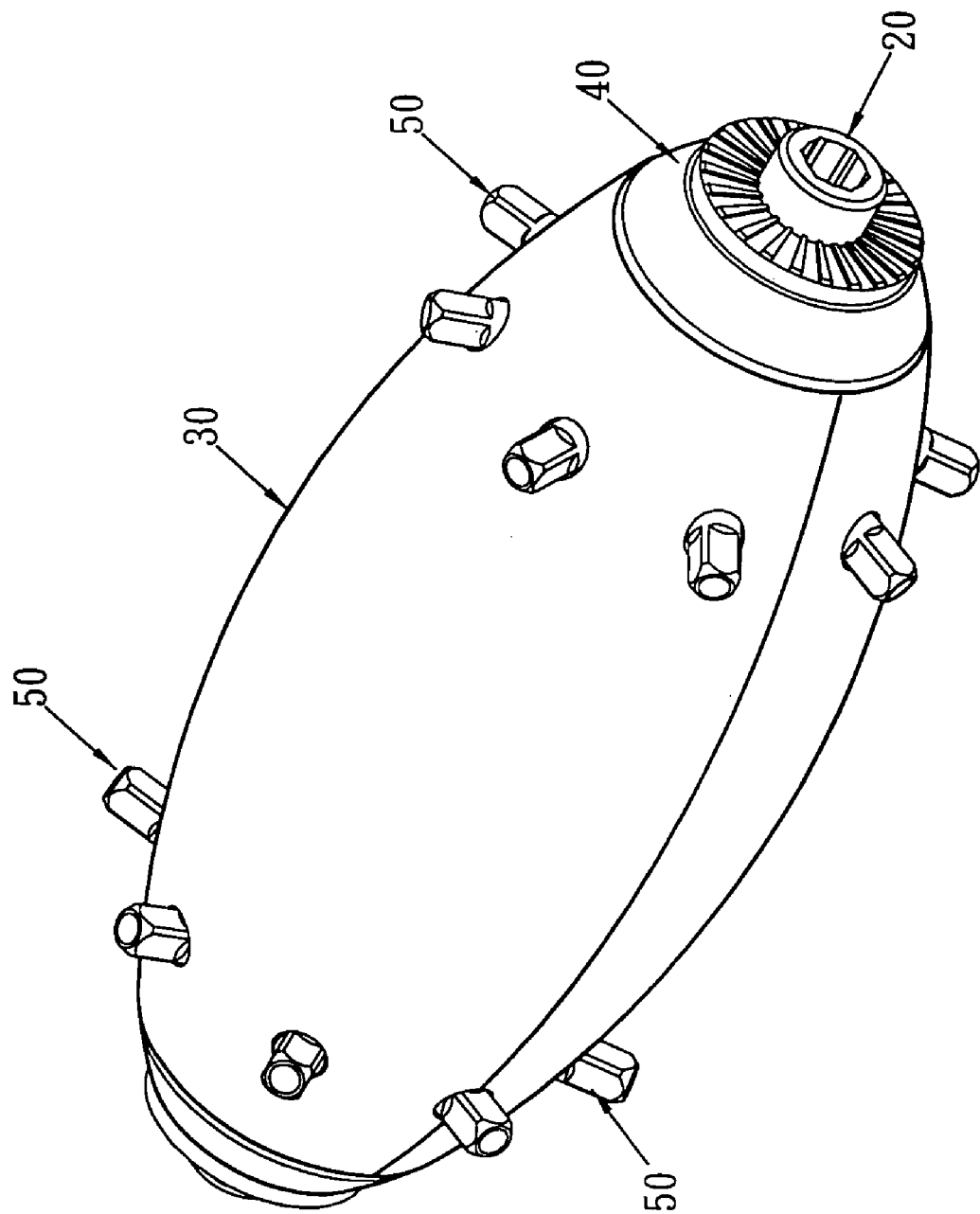
FIG. 1 is a perspective view to show the bicycle hub assembly of the present invention.
Figure 2:
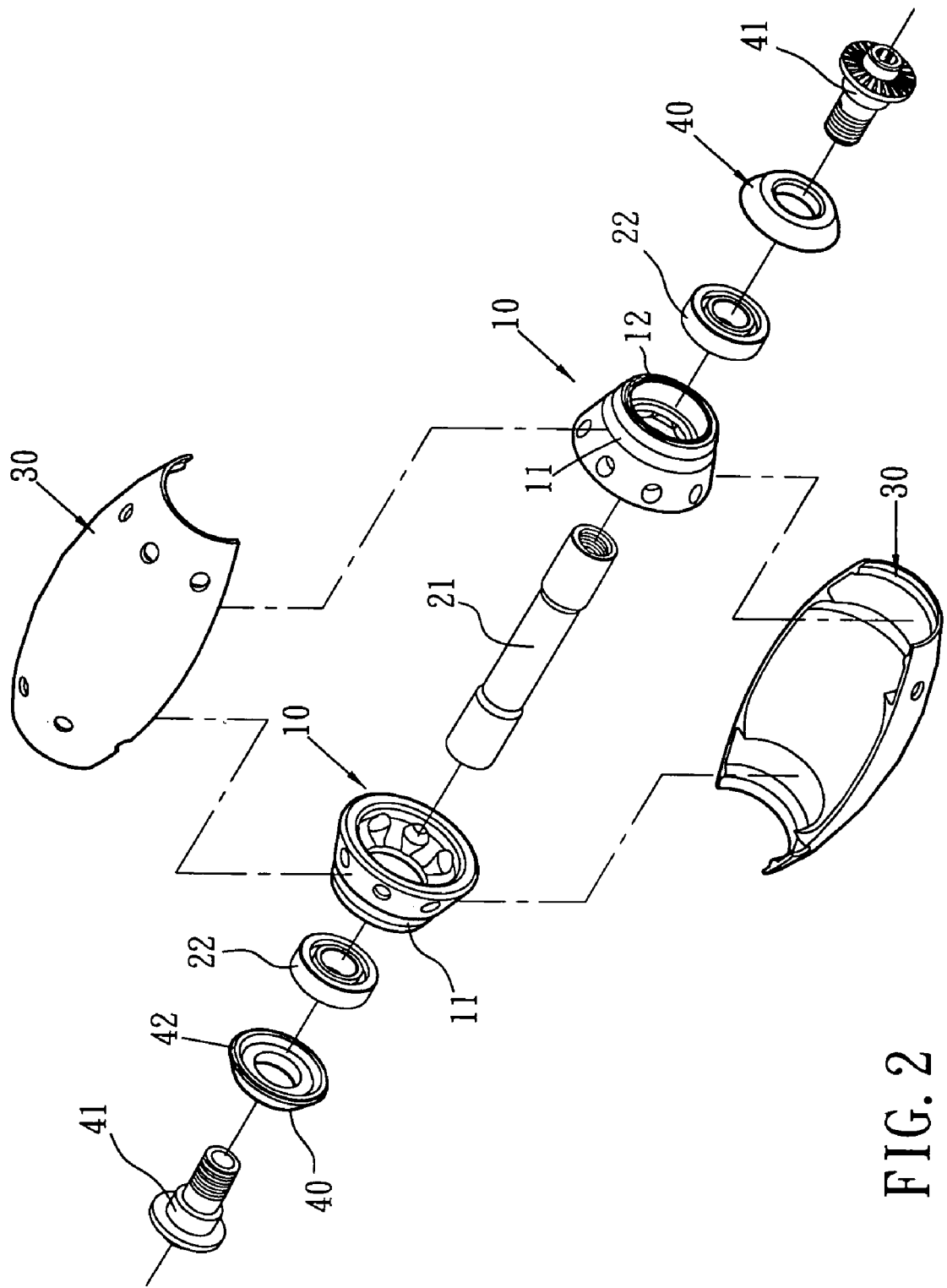
FIG. 2 is an exploded view to show the bicycle hub assembly of the present invention.
Figure 3:
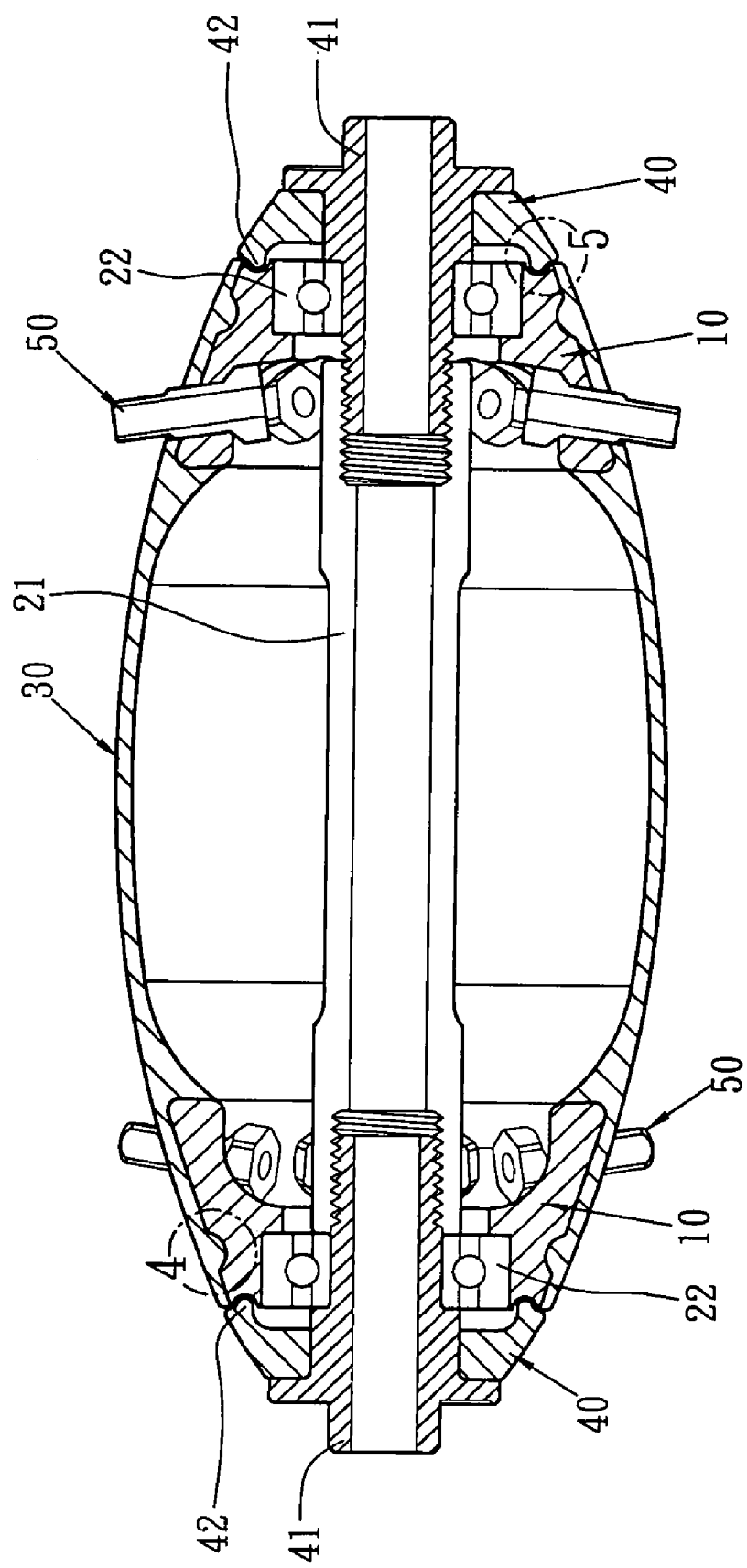
FIG. 3 is a side cross sectional view of the bicycle hub assembly of the present invention.

Referring to FIGS. 1 to 3, the bicycle hub assembly of the present invention comprises a support unit 10 which includes two end caps which are two collar-shaped member. Each end cap includes a first engaging portion 11 defined in an outer periphery thereof and a first connection portion 12 defined in a distal end thereof. In this embodiment, the first engaging portion 11 and the first connection portion 12 both are grooves.

An axle unit 20 is connected between the two end caps of the support unit 10 and includes an axle 21, two bearings 22 and two positioning bolts 41. Two ends of the axle 21 extend through the two bearings 22 located within the two end caps of the support unit 10 and the two collars 40. The two positioning bolts 41 extend through the collars 40 and are threadedly connected to the two ends of the axle 21.

A casing 30 is mounted to two respective outer peripheries of the two end caps of the support unit 10 and accommodates the axle unit 20 therein. Two collars 40 are connected to two distal ends of the two end caps of the support unit 10 and two ends of the casing 30.

As shown in FIGS. 1-3, the casing may Have a prolate spheroid profile.

Figure 4:
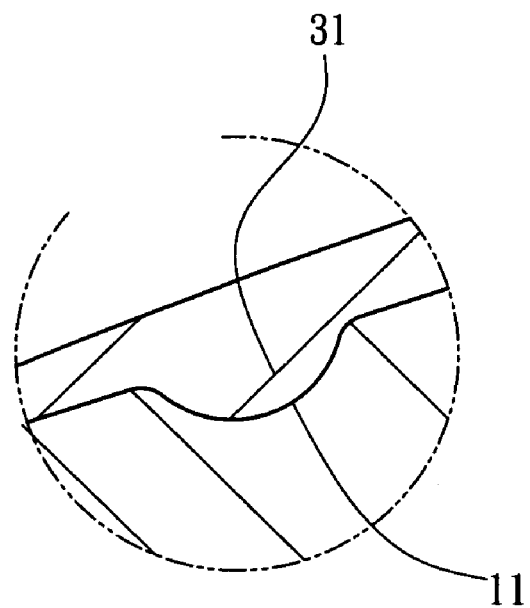
FIG. 4 is an enlarged cross sectional view to show the engagement between the first and second engaging portions.
Figure 5:
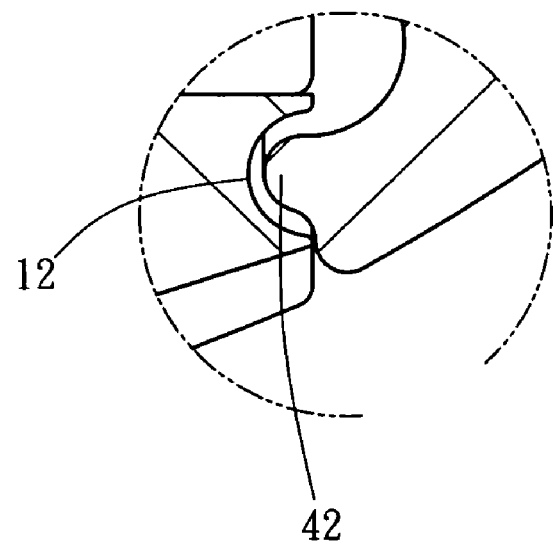
FIG. 5 is an enlarged cross sectional view to show the engagement between the first and second connection portions.

Further referring to FIGS. 4 and 5, the casing 30 includes two second engaging portions 31 which are ridges and engaged with the first engaging portions 11. The two collars 40 each have a second connection portion 42 which is a ridge and connected to the first connection portion 12 corresponding thereto. Multiple copper heads 50 are connected to the two end caps of the support unit 10 and protrude outward from the casing 30 at an angle.

Figure 6:
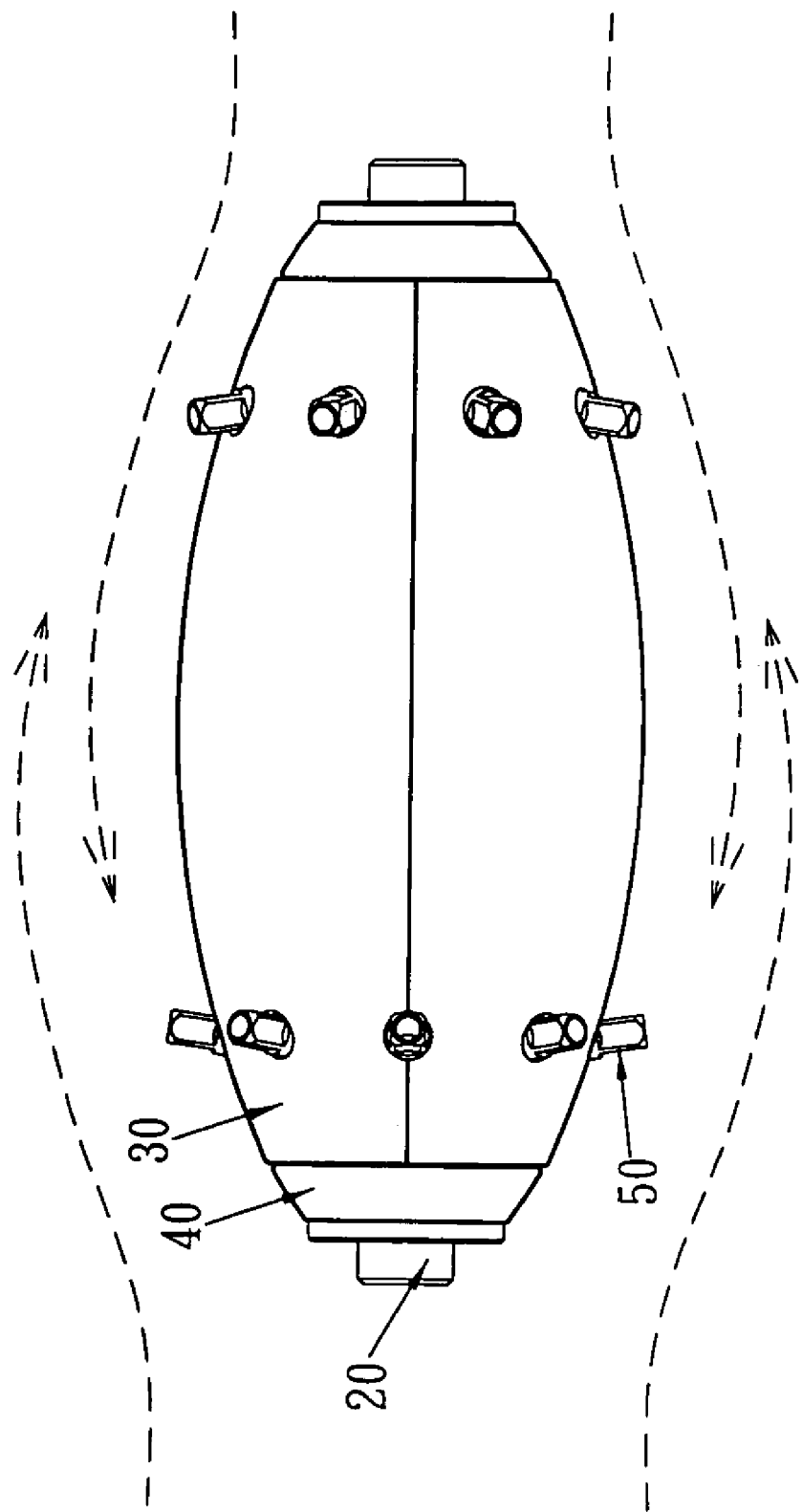
FIG. 6 shows that wind flows through the smooth and curved outer shape of the bicycle hub assembly of the present invention.

Referring to FIG. 6, the two end caps of the support unit 10 and the casing 30 form a smooth and curved outer shape, so that when the wheel rotates, the wind flows along the smooth and curved outer shape of the hub assembly and does not generate turbulence to drag the wheel.

By the engagement of the first engaging portion 11 and the second engaging portion 31, and the engagement of the first connection portion 12 and the second connection portion 42, dust and rain can be effectively prevented from entering the inside of the hub assembly.

It is noted that the casing 30 and the collars 40 are made of composite material or plastic material. The end caps of the support unit 10 can also be made of aluminum alloy. Different materials achieve specific purpose such as light weight or durability.

Figure 7:
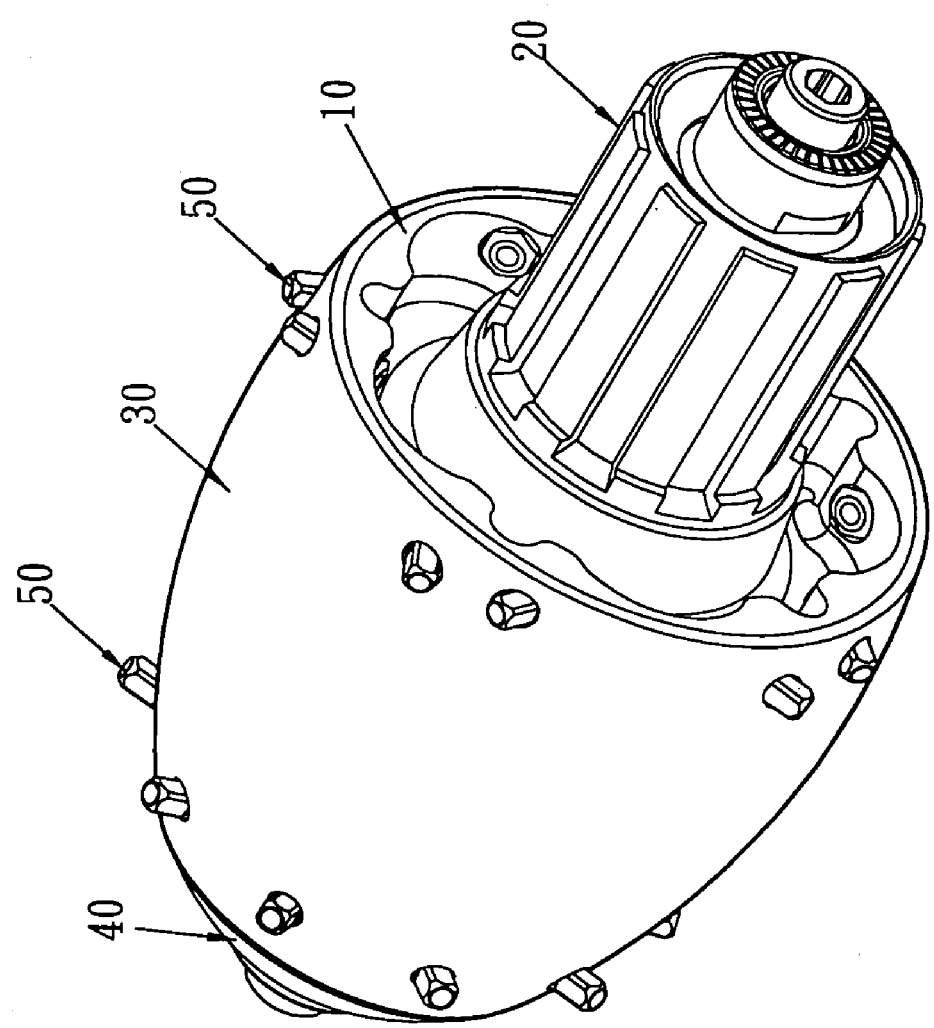
FIG. 7 shows another embodiment of the bicycle hub assembly of the present invention.
Figure 8:
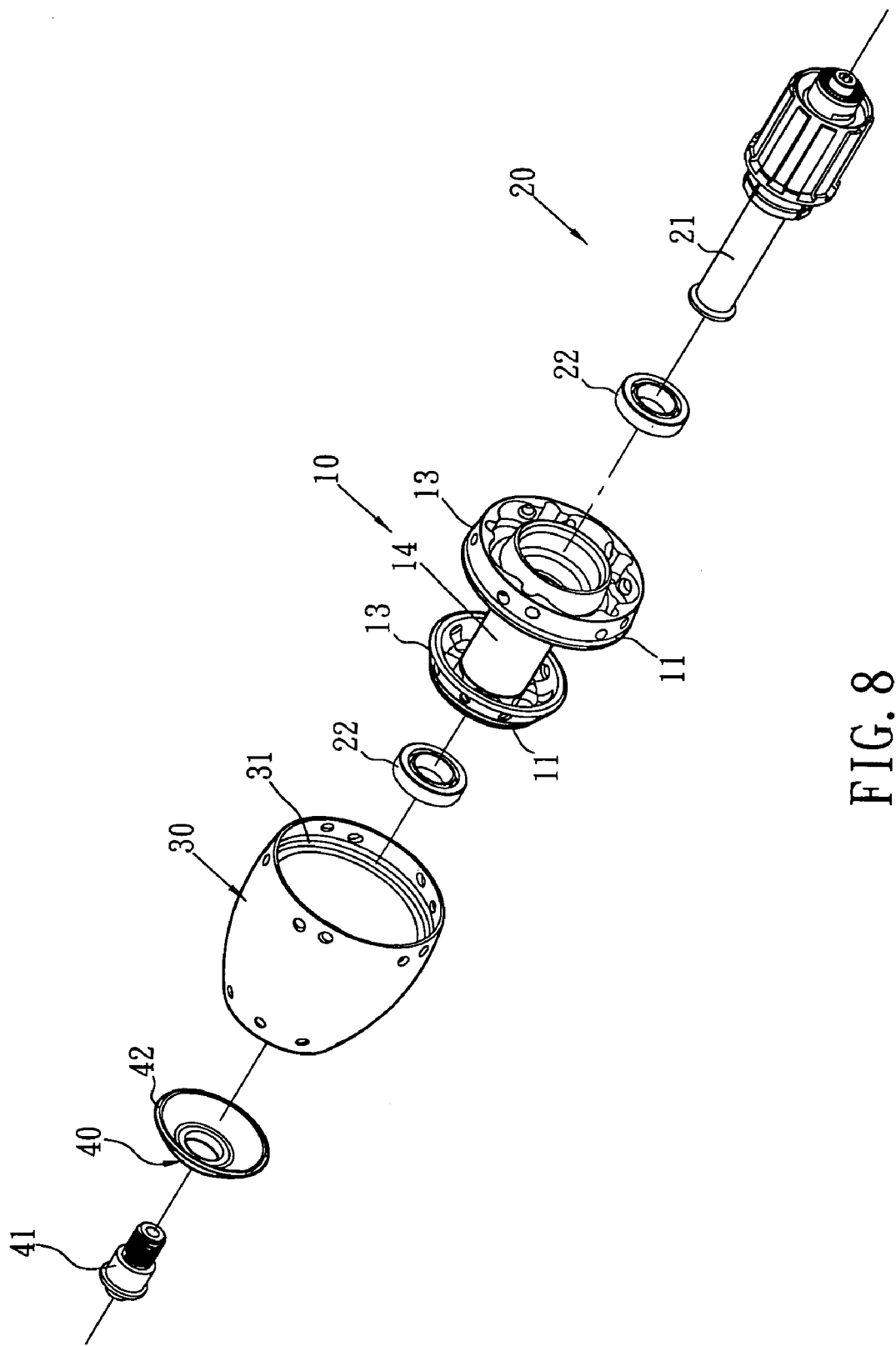
FIG. 8 shows the bicycle hub assembly of the present invention in FIG. 7.
Figure 9:
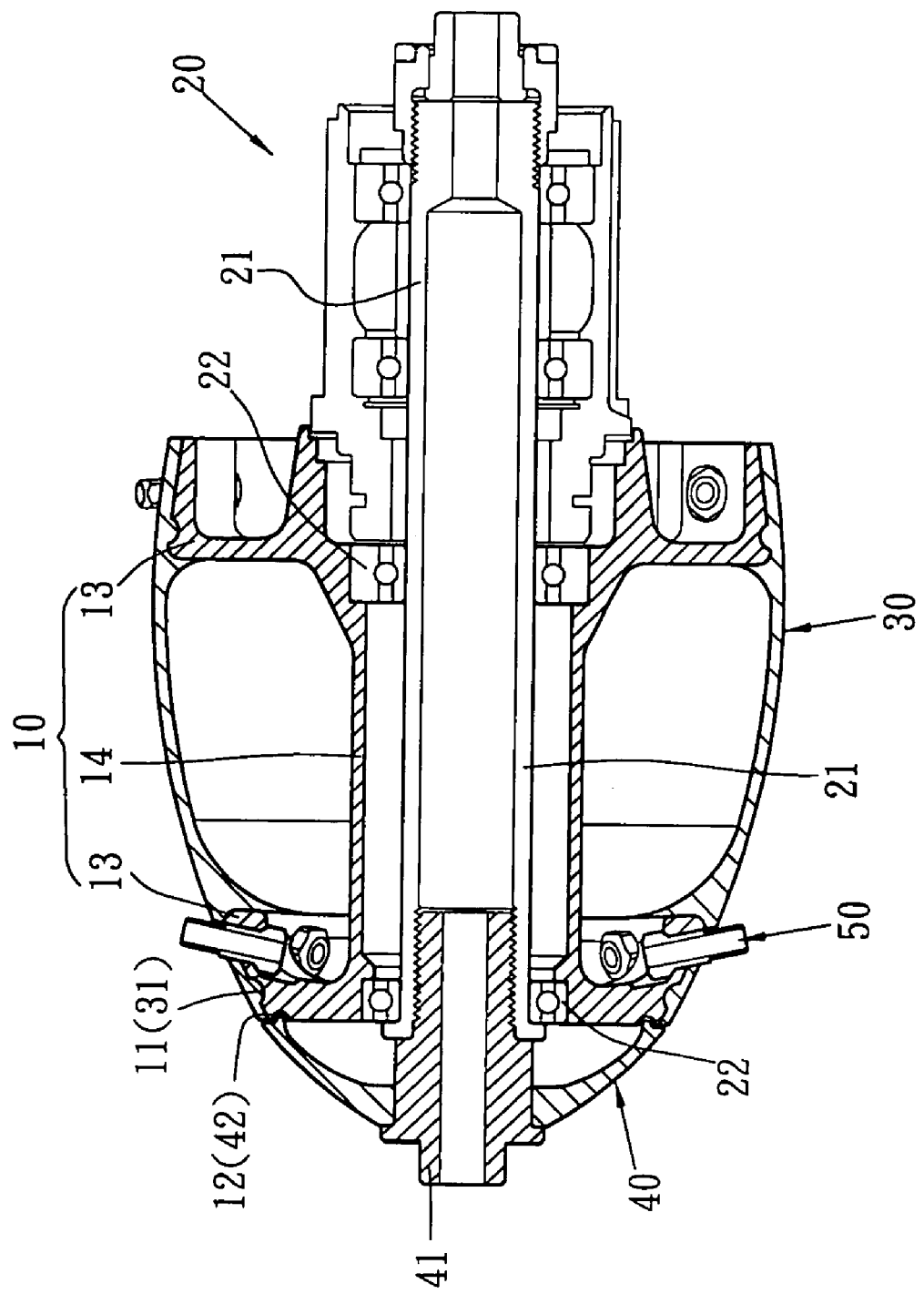
FIG. 9 is a side cross sectional view of the bicycle hub assembly of the present invention in FIG. 7.
Figure 10:
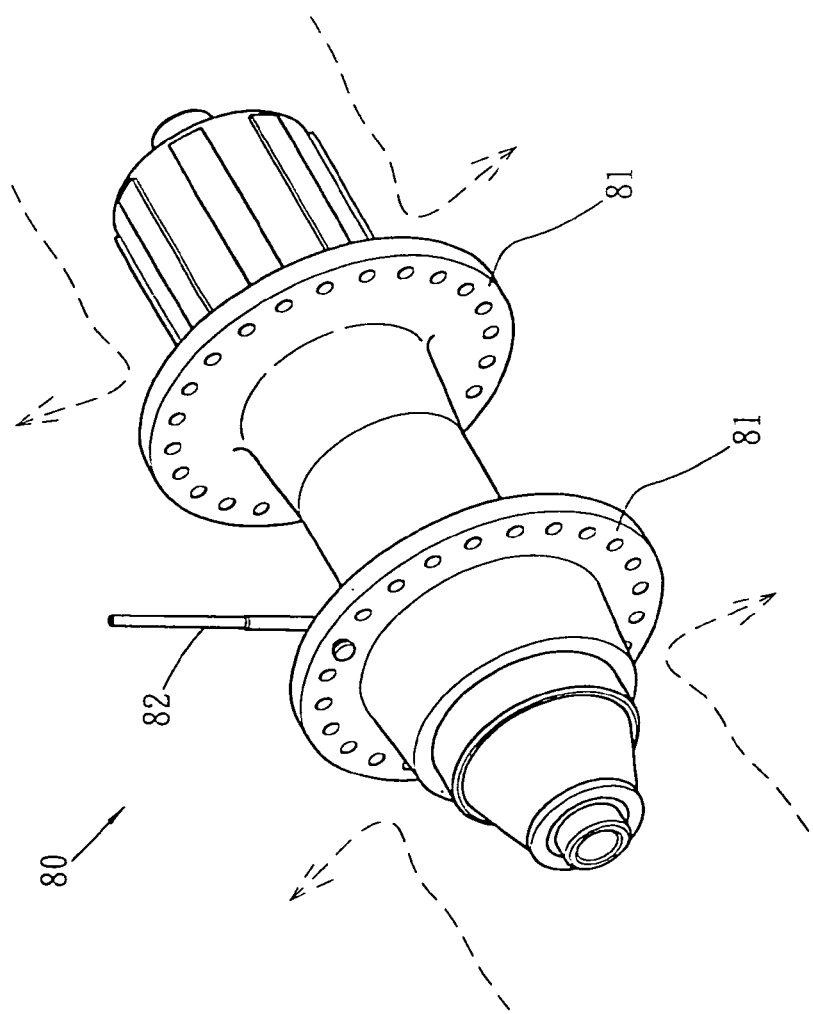
FIG. 10 shows a conventional bicycle hub assembly.

FIGS. 7 to 9 disclose a second embodiment of the bicycle hub assembly of the present invention and the second embodiment is used for the rear wheel, wherein the support unit 10 includes two flanges 13 and a hollow tube 14 which is connected between the two flanges 13. The axle unit 20 is located within the two flanges 13 and the hollow tube 14. The flanges 13 and the hollow tube 14 can be made as a one-piece and the casing 30 is mounted to the support unit 10 and one positioning bolt 41 extends through the collar 40 and is connected to the axle 21. The casing 30 and the collar 40 also form a smooth and curved outer shape so as to reduce the turbulence.

While we have shown and described the embodiment in accordance with the present invention, it should be clear to those skilled in the art that further embodiments may be made without departing from the scope of the present invention.

What is claimed is:

1. A bicycle hub assembly comprising:
    a pair of support units, each support unit including an end cap having a collar-shaped member, each end cap having a first and second end;
    an axle unit connected between the end caps of the support units;
    a casing mounted to the first end of each end cap of the support units and accommodating the axle unit therein; and
    two collars, each collar connected to a corresponding one of the second end of the end cap;
    wherein the axle unit includes an axle and two positioning bolts, both ends of the axle extend into a corresponding end cap and collar of the support units, each of the positioning bolts extend through a corresponding collar and is threadedly connected to a corresponding end of the axle.

2. The assembly as claimed in claim 1, wherein each of the two end caps of the support unit includes a first engaging portion defined in an outer periphery thereof and the casing includes two second engaging portions which are engaged with the first engaging portions.

3. The assembly as claimed in claim 2, wherein the first engaging portions are two grooves and the two second engaging portions are two ridges.

4. The assembly as claimed in claim 1, wherein each of the two end caps of the support unit includes a first connection portion defined in the second end thereof and the two collars each have a second connection portion which is connected to the first connection portion corresponding thereto.

5. The assembly as claimed in claim 4, wherein the first connection portion are two grooves and the two second connection portions are two ridges.

6. The assembly as claimed in claim 4, wherein multiple copper heads are connected to the two end caps of the support unit and protrude outward from the casing at an angle.

7. The assembly as claimed in claim 1, wherein the axle unit includes an axle and two bearings which are located within the end caps of the support unit, the axle extends through the two bearings.

8. The assembly as claimed in claim 1, wherein the casing and the collars are made of composite material.

9. The assembly as claimed in claim 1, wherein the casing and the collars are made of plastic material.

10. The assembly as claimed in claim 1, wherein the end caps of the support unit are made of aluminum alloy.

11. The assembly as claimed in claim 1, wherein the support unit includes two flanges and a hollow tube which is connected between the two flanges, the axle unit is located within the two flanges and the hollow tube.

12. The assembly as claimed in claim 11, wherein the two flanges and the hollow tube of the support unit are made as one-piece.

13. The assembly as claimed in claim 1, wherein the two end caps of the support unit and the casing form a smooth and curved outer shape.

14. The assembly as claimed in claim 1, wherein the casing has a prolate spheroid profile.

* * * * *